(12) United States Patent
Kanevsky et al.

(10) Patent No.: US 8,856,002 B2
(45) Date of Patent: Oct. 7, 2014

(54) DISTANCE METRICS FOR UNIVERSAL PATTERN PROCESSING TASKS

(75) Inventors: Dimitri Kanevsky, Ossining, NY (US);
David Nahamoo, Great Neck, NY (US);
Tara N Sainath, Burlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1256 days.

(21) Appl. No.: 12/101,791

(22) Filed: Apr. 11, 2008

(65) Prior Publication Data

US 2009/0259471 A1 Oct. 15, 2009

Related U.S. Application Data

(60) Provisional application No. 60/911,333, filed on Apr. 12, 2007.

(51) Int. Cl.
*G10L 15/26* (2006.01)
*G10L 15/14* (2006.01)
*G10L 15/00* (2013.01)
*G10L 15/28* (2013.01)
*G10L 21/00* (2013.01)
*G10L 17/04* (2013.01)
*G10L 15/06* (2013.01)

(52) U.S. Cl.
CPC .............. *G10L 17/04* (2013.01); *G10L 15/063* (2013.01)
USPC ........... 704/235; 704/243; 704/244; 704/246; 704/256; 704/256.7; 704/260; 704/236; 704/240; 704/255; 704/277

(58) Field of Classification Search
USPC .............. 704/260, 243, 244, 246, 256, 256.7, 704/235, 236, 240, 255, 277
See application file for complete search history.

(56) References Cited

U.S. PATENT DOCUMENTS

| | | | | |
|---|---|---|---|---|
| 4,697,242 A * | 9/1987 | Holland et al. | .................. | 706/13 |
| 5,621,809 A * | 4/1997 | Bellegarda et al. | ........... | 382/116 |
| 5,835,890 A * | 11/1998 | Matsui et al. | ................. | 704/255 |
| 5,970,239 A * | 10/1999 | Bahl et al. | ..................... | 704/245 |
| 6,122,613 A * | 9/2000 | Baker | ........................... | 704/235 |
| 6,125,345 A * | 9/2000 | Modi et al. | .................... | 704/240 |
| 6,243,676 B1 * | 6/2001 | Witteman | ..................... | 704/243 |
| 6,253,169 B1 * | 6/2001 | Apte et al. | ....................... | 704/9 |
| 6,260,013 B1 * | 7/2001 | Sejnoha | ........................ | 704/240 |
| 6,556,969 B1 * | 4/2003 | Assaleh et al. | ............. | 704/256.5 |
| 6,662,158 B1 * | 12/2003 | Hon et al. | ..................... | 704/252 |

(Continued)

OTHER PUBLICATIONS

Min-Seok Kim et al., "Robust Text-Independent Speaker Identification Using Hybrid PCA & LDA", MICAI 2006, LNAI4293, pp. 1067-1074, Nov. 13, 2006.*

(Continued)

*Primary Examiner* — Edgar Guerra-Erazo
(74) *Attorney, Agent, or Firm* — Anne V. Dougherty, Esq.; McGinn IP Law Group, PLLC

(57) ABSTRACT

A universal pattern processing system receives input data and produces output patterns that are best associated with said data. The system uses input means receiving and processing input data, a universal pattern decoder means transforming models using the input data and associating output patterns with original models that are changed least during transforming, and output means outputting best associated patterns chosen by a pattern decoder means.

17 Claims, 6 Drawing Sheets

(56) References Cited

U.S. PATENT DOCUMENTS

| | | | |
|---|---|---|---|
| 6,772,120 B1* | 8/2004 | Moreno et al. | 704/256 |
| 6,799,162 B1* | 9/2004 | Goronzy et al. | 704/244 |
| 6,836,758 B2* | 12/2004 | Bi et al. | 704/231 |
| 6,898,567 B2* | 5/2005 | Balasuriya | 704/231 |
| 6,964,023 B2* | 11/2005 | Maes et al. | 715/811 |
| 7,016,835 B2* | 3/2006 | Eide et al. | 704/231 |
| 7,046,300 B2* | 5/2006 | Iyengar et al. | 348/515 |
| 7,251,603 B2* | 7/2007 | Connell et al. | 704/270 |
| 7,321,854 B2* | 1/2008 | Sharma et al. | 704/243 |
| 7,325,008 B2* | 1/2008 | Attias | 1/1 |
| 7,343,289 B2* | 3/2008 | Cutler et al. | 704/259 |
| 7,366,645 B2* | 4/2008 | Ben-Arie et al. | 703/6 |
| 7,634,405 B2* | 12/2009 | Basu et al. | 704/243 |
| 7,747,044 B2* | 6/2010 | Baker et al. | 382/116 |
| 7,801,838 B2* | 9/2010 | Colbath et al. | 706/20 |
| 7,979,276 B2* | 7/2011 | Morita | 704/235 |
| 2001/0051868 A1* | 12/2001 | Witschel | 704/9 |
| 2003/0009342 A1* | 1/2003 | Haley | 704/276 |
| 2004/0083013 A1* | 4/2004 | Tolley | 700/47 |
| 2004/0236576 A1* | 11/2004 | Thiesson et al. | 704/255 |
| 2005/0004788 A1* | 1/2005 | Lee et al. | 703/22 |
| 2006/0190252 A1* | 8/2006 | Starkie | 704/240 |
| 2008/0091424 A1* | 4/2008 | He et al. | 704/240 |
| 2008/0101705 A1* | 5/2008 | Mohamed et al. | 382/224 |
| 2008/0255844 A1* | 10/2008 | Wu | 704/255 |
| 2009/0132444 A1* | 5/2009 | Liu et al. | 706/12 |

OTHER PUBLICATIONS

I. Hara et al., "Robust speech interface based on audio and video information fusion for humanoid HRP-2," IROS-2004. pp. 2404-2410.*

Sainath, T.N.; Kanevsky, D.; Iyengar, G. "Unsupervised Audio Segmentation using Extended Baum-Welch Transformations", Acoustics, Speech and Signal Processing, 2007. ICASSP 2007. IEEE International Conference on, on pp. I-209-I-212 vol. 1, Apr. 15-20, 2007.*

Sainath, T.N.; Kanevsky, D.; Ramabhadran, B. "Broad phonetic class recognition in a Hidden Markov model framework using extended Baum-Welch transformations", Automatic Speech Recognition & Understanding, 2007. ASRU. IEEE Workshop on, on pp. 306-311.*

* cited by examiner

DISTANCE METRICS FOR UNIVERSAL PATTERN PROCESSING TASKS

This Application claims priority to the Provisional Application No.: 60/911,333, which is referred to by filed on Apr. 12, 2007, and incorporated herein by reference.

BACKGROUND OF THE INVENTION

1. Field of the Invention

The present invention relates to universal pattern processing tasks.

2. Description of the Related Art

Universal pattern processing tasks include at least any process that involves pattern recognition tasks (e.g speech or image recognition), segmentation (e.g. audio segmentation), identification (e.g. speaker), verification (e.g. speaker), search, translation, text-to-speech, information retrieval, audio-retrieval, image retrieval, language processing tasks, summarization, simplification etc.

In general, in universal pattern processing tasks such as classification, segmentation, translation, search etc., the best model is identified as follows. Let $F(Y,\lambda)$ be some score (e.g. likelihood score) function that characterizes a model $\lambda$ given data Y. Then the "best" model could be found by the following rule:

$$\tilde{\lambda} = \operatorname{argmax}_{\lambda \in \Theta} F(Y,\lambda) \quad (1)$$

where $\Theta$ is a family of models.

That is, the quality of the model was measured by how well the model fit the data. A likelihood score is calculated between the model and the data, and if the likelihood score is high, then the model fits the data well. To have a function such as matching maximum likelihood to match a model to data, the function and data must be trained. The likelihood score measured how well the data fit the model.

This method in most cases does not give perfect processing recognition accuracy. Thus, a need exists for additional methods to improve pattern processing in various tasks.

SUMMARY OF THE INVENTION

The universal distance pattern processing technique in this invention can be described generally as follows.

The technique of the present invention was developed with training a model on test data. Different models for decoding are available, such that if one model is correct, others are incorrect. The present inventors have found that a model for correct decoding is changed less than other models when trained on test data.

That is, the present invention applies data to a set of models, and measures the change of model before and after the data is applied. By identifying which model is changed the least by the data, the present invention does not measure how well the data fits a model, but instead indicates which of several models is the best fit to the data.

Assume that there have been identified several models $\lambda \in \Theta$ as models that may represent some data Y, and one needs to identify which model best characterizes the data Y. We can update or train each of the models $\lambda \in \Theta$ using data Y. During such updating or training, each of the models $\lambda \in \Theta$ changes in response to the input data Y. In general, the model that best fits the data will change the least. Therefore, determining which model changed least when the models were exposed to the data can identify a best fitting model.

More specifically, define $T(Y, \lambda)$ as a ratio of a model change in some metrics when a model $\lambda$ was exposed to data Y. Then the "best" model can be defined by the following rule:

$$\tilde{\lambda} = \operatorname{argmin}_{\lambda \in \Theta} T(Y,\lambda) \quad (2)$$

where $\Theta$ is a family of models.

Incidentally, implementation of this concept is described herein as used on Hidden Markov Models (HMM), but it can also be applied to various other different kinds of models.

In a first exemplary aspect of the present invention, described herein is a universal pattern processing system that receives input data and produces output patterns that are best associated with this data. The system transforms models using the input data, and then associates output patterns with original models that are changed least during this transformation process.

BRIEF DESCRIPTION OF THE DRAWINGS

The foregoing and other purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Distance HMM Metrics

Figure 1:
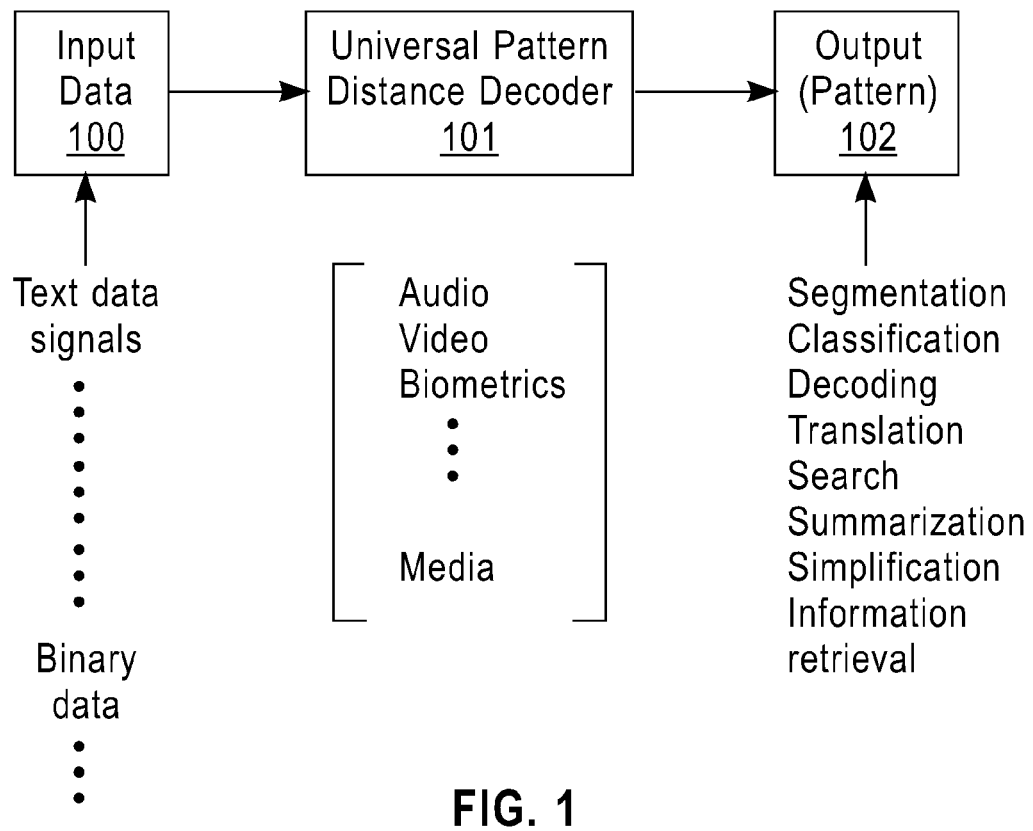
FIG. 1 shows basic operation of a universal pattern distance decoder embodying the present invention.

In this section is described a method for computing Extended Baum-Welch Transformations (EBW) distance T for Hidden Markov Models (HMM). In general, the EBW distance $T(Y, \lambda)$ between data Y and a model $\lambda$ can be used to find the "best" model by the following rule:

$$\tilde{\lambda} = \operatorname{argmin}_{\lambda \in \Theta} T(Y,\lambda) \quad (3)$$

where $\Theta$ is a family of models.

In order to apply this distance to some HMM M with continuous Gaussian parameters, one can choose the best path $S = s_1, \ldots s_n$ in this HMM model. The likelihood of this HMM becomes the product $$Q = \prod_{i=1}^{n} q_i \quad (4)$$

where each $q_i$ is a mixture of Gaussian components $$\sum_{k=1}^{r(i)} w_{ik} N\left(y_i, \mu_{ik}, \sum_{ik}\right)$$

(or some Gaussian components $$q_i = w_{ik} N(y_i, \mu_{ik(i)}, \Sigma_{ik(i)}) \quad (5)$$

if the best state path is taken along Gaussian components in mixtures).

Applying distance T to HMM consists of the following steps:

1) Application of T to likelihood score for the best HMM-path by using the multiplicative property of T that allows to represent T (F1\*F2) as T(F1)F2+F1\*T(F2). Using this property, we represent T(Q)/Q as $\Sigma T(Q_i)/Q_i$ for the likelihood score of the best path. Such representation is attractive because this expression is smaller if $T(Q_i)$ is smaller and $Q_i$ is bigger. Note that the definition of T in this representation depends on the function $Q_i$ and on EBW transformation of $\mu$ and $\Sigma$. This transformation depends on Q.

2) Computing the full likelihood score (for all HMM paths) by extending forward-backward algorithm to T.

To understand further, first review the following definitions. EBW transformations can be described as follows: Let $F(Z)=F(Z_{ij})$, i=1, ... n, j=1, ... m be some function in variables $Z=(Z_{ij})$, and differentiable at $Z=z\epsilon R^{nm}$. Let $$c_{ij} = c(F)_{ij} = c(F, z)_{ij} = z_{ij}\frac{\delta}{\delta z_{ij}}F(z)$$

(we can drop z and/or F in $c(F,z)_{ij}$ if it is clear from the context).

I. Gaussian Mixture Densities:

$$\hat{\mu}_j = \mu_j(F, \alpha) = \frac{\sum_{i \in I} c(F, z)_{ij} y_i \alpha + \mu_j}{\sum_{i \in I} c(F, z)_{ij} \alpha + 1} \quad (6)$$

$$\hat{\sigma}_j^2 = \sigma_j(F, \alpha)2 = \frac{\sum_{i \in I} c(F, z)_{ij} y_i^2 \alpha + (\mu_j^2 + \sigma_j^2)}{\sum_{i \in I} c(F, z)_{ij} \alpha + 1} - \hat{\mu}_j^2 \quad \text{where} \quad (7)$$

$$z = \{z_{ij}\} = \left\{\frac{1}{(2\pi)^{1/2}\sigma_j} e^{-(y_i - \mu_j)^2/2\sigma_j^2}\right\} \quad (8)$$

and $y_i$ is a sample of training data.

II. Multidemensional Multivariate Gaussian Mixture Densities:

$$\hat{\mu}_j = \mu_j(F, \alpha) = \frac{\sum_{i \in I} c(F, z)_{ij} y_i \alpha + \mu_j}{\sum_{i \in I} c(F, z)_{ij} \alpha + 1} \quad (9)$$

$$\hat{\sum}_j = \sum_j (F, \alpha) = \frac{\sum_{i \in I} c(F, z)_{ij} y_i y_i^T \alpha + \left(\mu_j \mu_j^T + \sum_j\right)}{\sum_{i \in I} c(F, z)_{ij} \alpha + 1} - \hat{\mu}_j \hat{\mu}_j^T \quad (10)$$

where $$z = \{z_{ij}\} = \{z(F, \alpha)_{ij}\} = \left\{\frac{|\Sigma_j|^{-1/2}}{(2\pi)^{d/2}} e^{-1/2(y_i - \mu_j)^T \Sigma_j^{-1}(y_i - \mu_j)}\right\} \quad (11)$$

$$\hat{z} = \{\hat{z}_{i,j}\} = z(F, \alpha)_{ij} = \left\{\frac{|\hat{\Sigma}_j|^{-1/2}}{(2\pi)^{d/2}} e^{-1/2(y_i - \hat{\mu}_j)^T \hat{\Sigma}_j^{-1}(y_i - \hat{\mu}_j)}\right\} \quad (12)$$

and $y_i^T = (y_{i1}, \ldots y_{in})$ is a sample of training data.

The Distance Definition

Consider one model $$\lambda = \{\mu, \Sigma\} \quad (13)$$

and $$\hat{\lambda} = \lambda(F, \alpha) = \{\mu(F, \alpha), \Sigma(F, \alpha)\} \quad (14)$$

Let $Y = Y_1^n = \{y_1, \ldots y^n\}$ be a sample of test data. For each frame $y_t$ define $$p(y_t | \lambda) = \frac{|\Sigma|^{-1/2}}{(2\pi)^{d/2}} e^{-1/2(y_t - \mu)^T \Sigma_i^{-1}(y_t - \mu)} = z_t \quad (15)$$

Let $G(\{Z_t\})$ be a function that is differentiable at $\{z_t\}$. For example, G is a log-likelihood function:

$$G(\{z_t\}) = \log p(y_1^n | \lambda) = \sum_{t=1}^{m} c_t \log p(y_t | \lambda) = G(\{z_t, t = 1, \ldots n\}) \quad (16)$$

Using EBW transformations (9) and (10) $\lambda \to \hat{\lambda} = \lambda(F, \epsilon)$, $\{z_t\} \to \{\hat{z}_t\} = \{z_t(F, \epsilon)\}$ we get an initial part of the Taylor series $$G(\{z_t(F, \epsilon)\}) = G(\{z_t\}) + T(\lambda, F, G)\epsilon + o(\epsilon) \quad (17)$$

We write T (F, G), if $\lambda$ is clear from the context. We set $T(\lambda, F, G) = T(\lambda, F)$ (or T(F)) if F=G. For F=G the distance T in the above formula was computed in D. Kanevsky, "Extended Baum Transformations for General Functions, II", tech. Rep. RC23645(W0506-120), Human Language technologies, IBM, 2005. It was shown there that it is always non-negative.

Model Tying

In the likelihood expression for the best HMM path (4) some different $q_i$ can be represented by the same set of models $M_i = \{\mu_{ik(i)}, \Sigma_{ik(i)}\}$ from a mixture (5) for different subscript i. Let us introduce a map L of subscripts $i \epsilon [1, \ldots N]$ of $M_i$ on a set S such that $L(i) = L(j) \epsilon S$ for any i, $j \epsilon [1, \ldots N]$ iff Mi=My. Then the product (4) can be represented as $$Q = \prod_{s \in S} Q_s \quad (18)$$

where $$Q_s = \prod_{\{i \in [1 \ldots N] | L(i) = s\}} Q_i \quad (19)$$

Let split a data $Y = y_1, \ldots y_T$ into subsets of frames $$Y_s = \{y_i | L(i) = s\} \quad (20)$$

-continued $$T(Q) = Q \sum_{\{s \in S\}} T(Q, Q_s)/Q_s \quad (21)$$

where $T(Q, Q_s)$ is associated with a subset of frames Ys. This tying may allow to increase a number of frames associated with each model in a distance expression for T.

Some Details on EBW-Distance for HMM

Let $\vec{S}^n = \{s(1), \ldots s(n)\}$ be a sequence a path in some HMM, i.e. a sequence of n states. Let $Y_1^n = \{y_1, \ldots y_n\}$ be an observed vector.

EBW State Distances

Let $p(y_t|s_t) = \Sigma_k w_k N(y_t|s(t)) = \Sigma_k w_k z_t^k = p(\{z_t^k\})$ be a Gaussian mixture. Define an EBW distance associated with a state s(t) and a frame $y_t$ as $T(y_t|s(t)) = T(p(\{z_t^k\}))$. Define normalized EBW distance associated with a state s(t) and a frame $y_t$ as (Normalized State Distance)

$$NST(y_t|s(t); \alpha) = T(p(\{z_t^k\}))/p(\{z_t^k\})^\alpha \quad (22)$$

where $\alpha$ is some positive number. For every path $\vec{S}^n$ and a vector $Y_1^n$ one can define its quality as sum of normalized state distances along this path:

$$NST\left(Y_1^n \middle| \vec{S}^n; \alpha\right) = \sum_t NST(y_t|s(t); \alpha) \quad (23)$$

The smaller $NST(Y_1^n|\vec{S}^n;\alpha)$ is, the better the data $Y_1^n$ is explained by this HMM path $\vec{S}^n$. For all paths in HMM $\vec{S}_r^n$ and a vector $Y_1^n$ one can define HMM quality as sum of normalized state distances along all these paths:

$$NST(Y_1^n; \alpha) = \sum_r NST\left(Y_1^n \middle| \vec{S}_r^n; \alpha\right) \quad (24)$$

The less $NST(Y_1^n;\alpha)$ is, the better the data $Y_1^n$ is explained by this HMM. The computations in (23 and 24) can be done by suitable modification of Viterby and forward-backward algorithms.

EBW State Distance Probability

We can associate with each HMM state distance a probability density as follows.

$$f(y_t|s(t)) = D^* e^{-T(y_t|s(t))} \quad (25)$$

With this probability distribution associated with HMM states one can apply standard HMM technique, where D is a normalized number (to turn f( ) into probability density).

DETAILED EMBODIMENT

Turning now to FIG. 1, Block 100 denotes any kind of data input: text data, signals (e.g. audio, video, media, biometrics), binary data (e.g. compiled code) etc. Block 101 represents a universal pattern distance decoder (e.g. speech recognizer for audio media, image recognizer for video media, identification for biometric media etc.). The pattern distance decoder 101 will be described in a different figure. Block 103 denotes output from 101—some patterns that are associated with data 101 via Block 101 (for example, segments for segmentizer, classes for classifier, decoded words for speech recognition, translation for machine translation, biometrics for speaker identification, search queries for a searching engine etc.).

Figure 2:
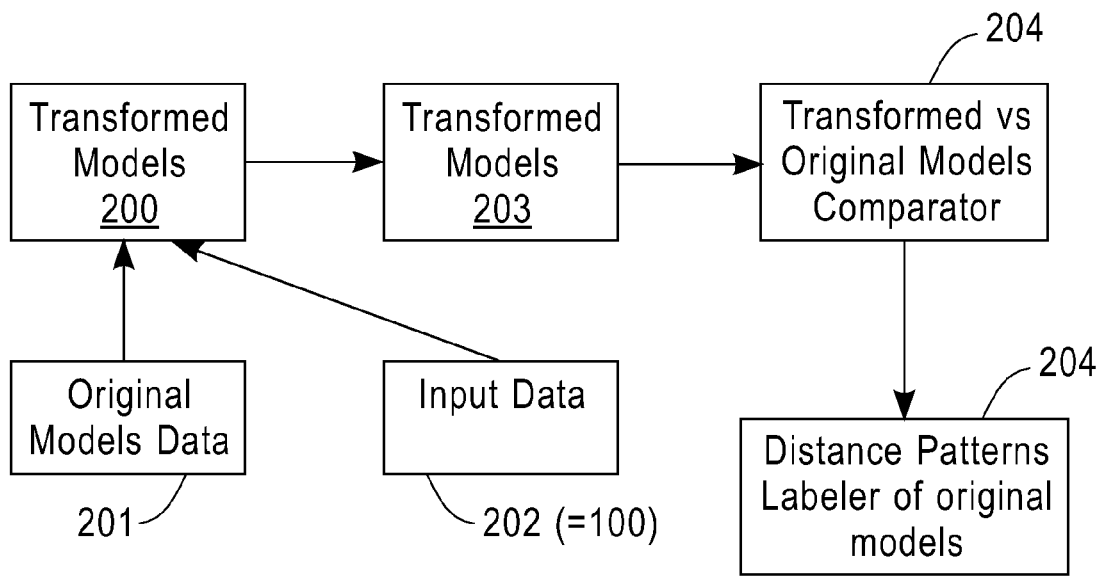
FIG. 2 shows operation of a pattern distance decoder of the present invention.

Turning now to FIG. 2, this figure describes in more detail the universal pattern distance decoder 101. Block 202 denotes original models that were trained on some training data prior to pattern recognition process (for example, Gaussian models that were trained on audio data before a decoding on a test data). Block 203 denotes test data (e.g. audio) that should be processed for some pattern recognition tasks using models from 202. Block 203 transforms models from 201 using test data from 203 (for example, trains Gaussian models on test data 203 using Extended-Baum-Welch transformation (9, 10) that were described in the Summary). The outputs of 203 are transformed models 204 (that were adapted to test data 202). These transformed models are fed to Block 205 Transformed vs. Original Models Comparator, which compares transformed models 203 to original models 201 using metrics (as described in FIG. 3). After 205 identifies transformed model that points to the best original models it labels best original models (e.g. choose the best decoding words in a speech recognition process, or the best matching speaker in the speaker identification process).

Figure 3:
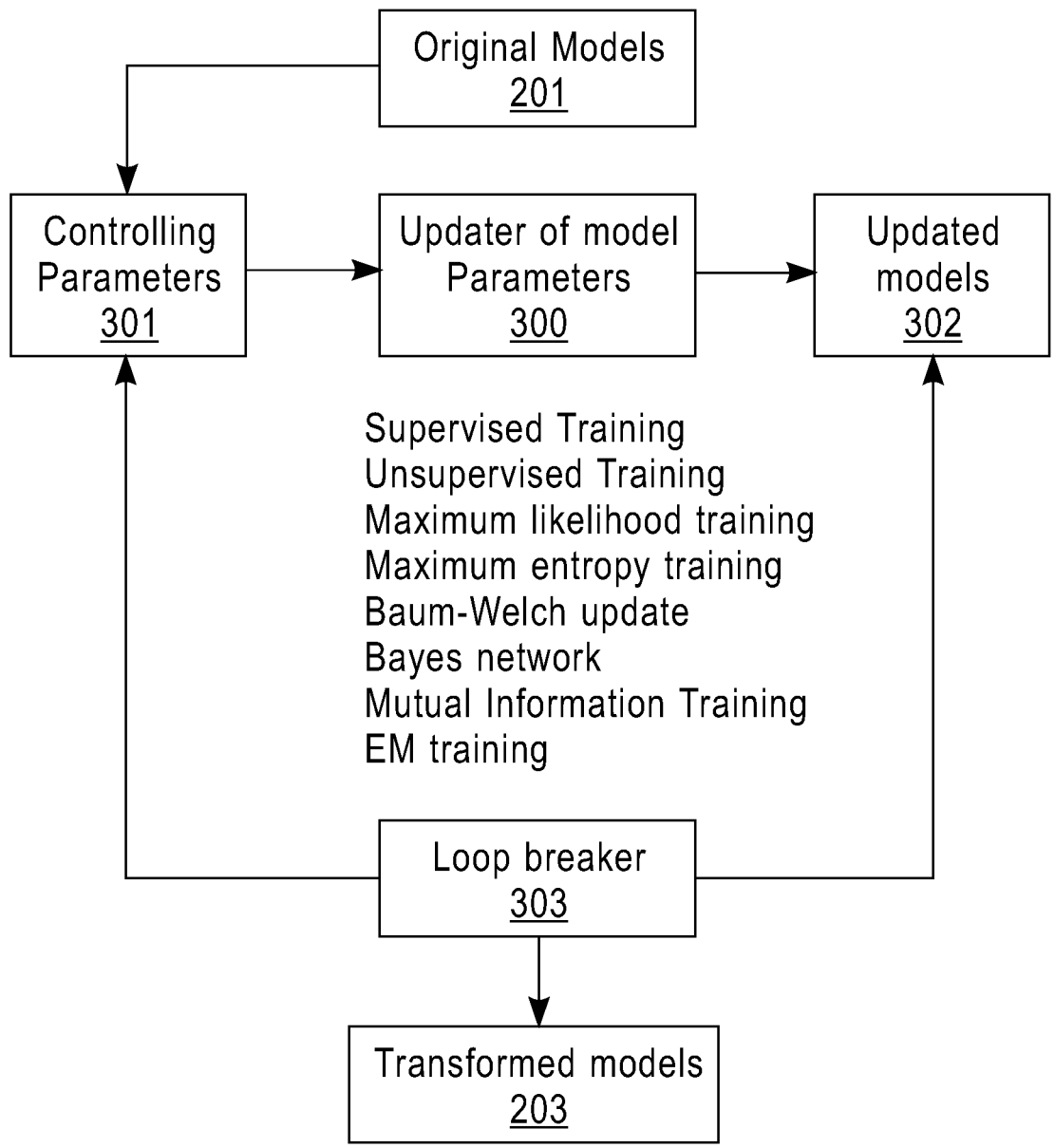
FIG. 3 shows operation of a models transformator of the present invention.

FIG. 3 provides explanations to 200 (Models Transformator). The block 300 (updater of model parameters) updates original models 201 using controlling 301 parameters for training process (one example of such controlling parameters ($\alpha$) could be found in (9, 10)). They control how much (and how fast) models are updated while they are exposed to data Y.

For example, the following are examples of processes that could be used to update models:
 Supervised Training
 Unsupervised Training
 Maximum likelihood training
 Maximum entropy training
 Baum-Welch update
 Expended Baum-Welch update
 Bayes network
 Mutual Information Training There can be several iterations in such updating process. The block 303 breaks update iterations using some criteria (e.g. a default number of iterations that were defined on training data). The output of this updating process is transformed models 203.

Figure 4:
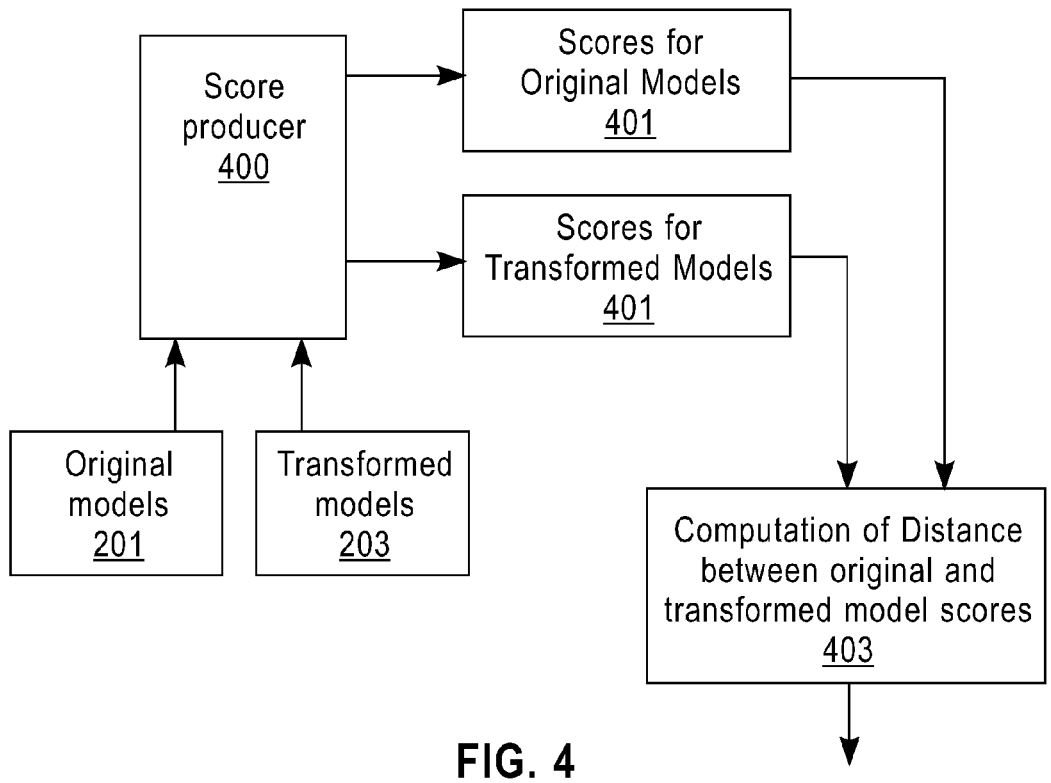
FIG. 4 shows operation of a models comparator of the present invention.

FIG. 4 provides explanations to 204 (Models Comparator). Block 400 is a score producer. Given test data, it produces scores 401 for original models 201 and scores 402 transformed models 203 using some metrics (for example, $F(Y, \lambda)$ for original models $\lambda$ and $F(Y, \lambda)$ for transformed models $\lambda$ where $F(Y, \lambda)$ is some score function (3) that characterizes a model $\lambda$ given data Y). In Block 403 (Computation of Distance between original and transformed model scores), these scores 401 and 402 are used to compute a ratio with which transformed models are changed when they were exposed data. Different metrics could be used to measure this change. Details of such metrics are described in FIG. 5.

Figure 5:
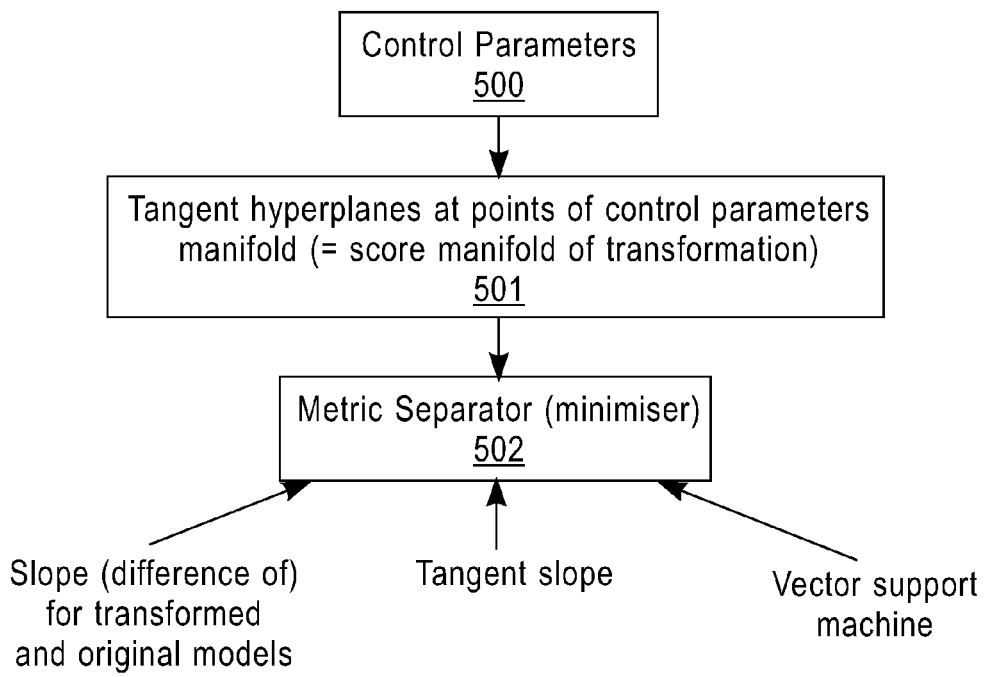
FIG. 5 shows distance computation in the present invention.

FIG. 5 provides explanations to 403 (Distant Computation). Block 500 provides control parameters (the same as 301) that are used to update models. For example, by varying $\alpha$ in (9, 10), one can get a parametric curve. Tangents hyperplanes to such control parameters manifold can characterize flatness of manifolds (e.g. tangents to a parametric curve represented by (9, 10) measure flatness of this curve). The flatness of parametric manifold usually represent the quality of models (the flatter the manifold, the better data is explained by the model). Block 502 provides metrics to represent quality of models (it chooses models that provide minimal changes to associated structures). These metrics can be represented as slopes (difference) for scores of transformed and original models, as tangent (slopes) to parametric curves or used Vector support machine to separate tangent hyperplanes to control parametric manifolds that represent different classes.

Figure 6:
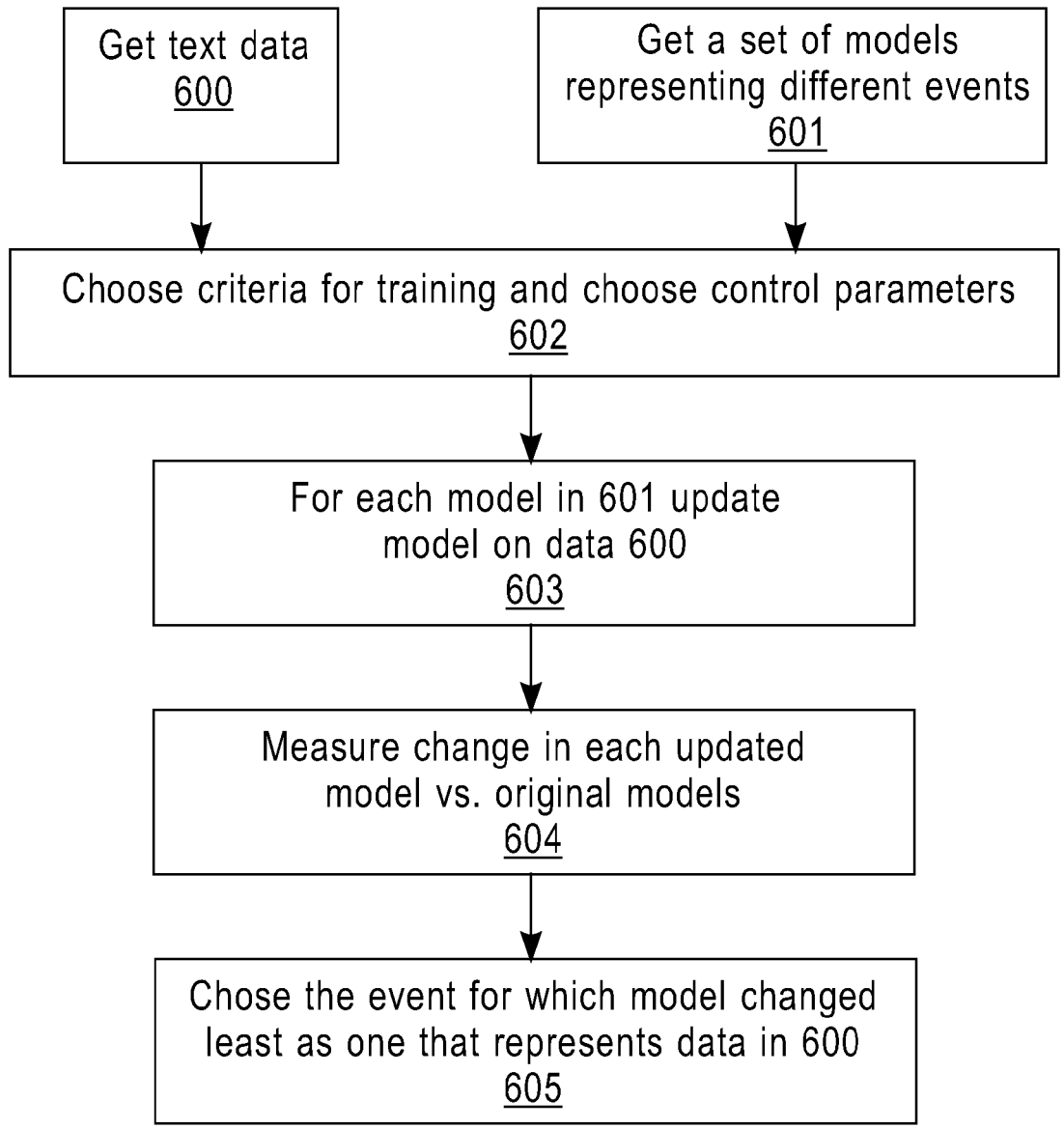
FIG. 6 shows a flow chart of an embodiment of the claimed method.

FIG. 6 is a flow chart of the invention. Block 600—the universal pattern processing system gets test data and in Block 601 the pattern processing system gets a set of models representing different events (e.g. classes, words, speakers etc.). Then the pattern processing system chooses criteria for training on test data (e.g. maximum likelihood, or maximum entropy, maximum mutual information) and also values for control parameters that control training. In Block 603 the pattern processing system updates each model in 601 using data from 601. In Block 604 the pattern processing system measures change in each updated model in comparison with original models. In Block 605 the pattern processing system chooses the event whose associated model changed least as the decoding result of this pattern process.

Exemplary Hardware Implementation

Figure 7:
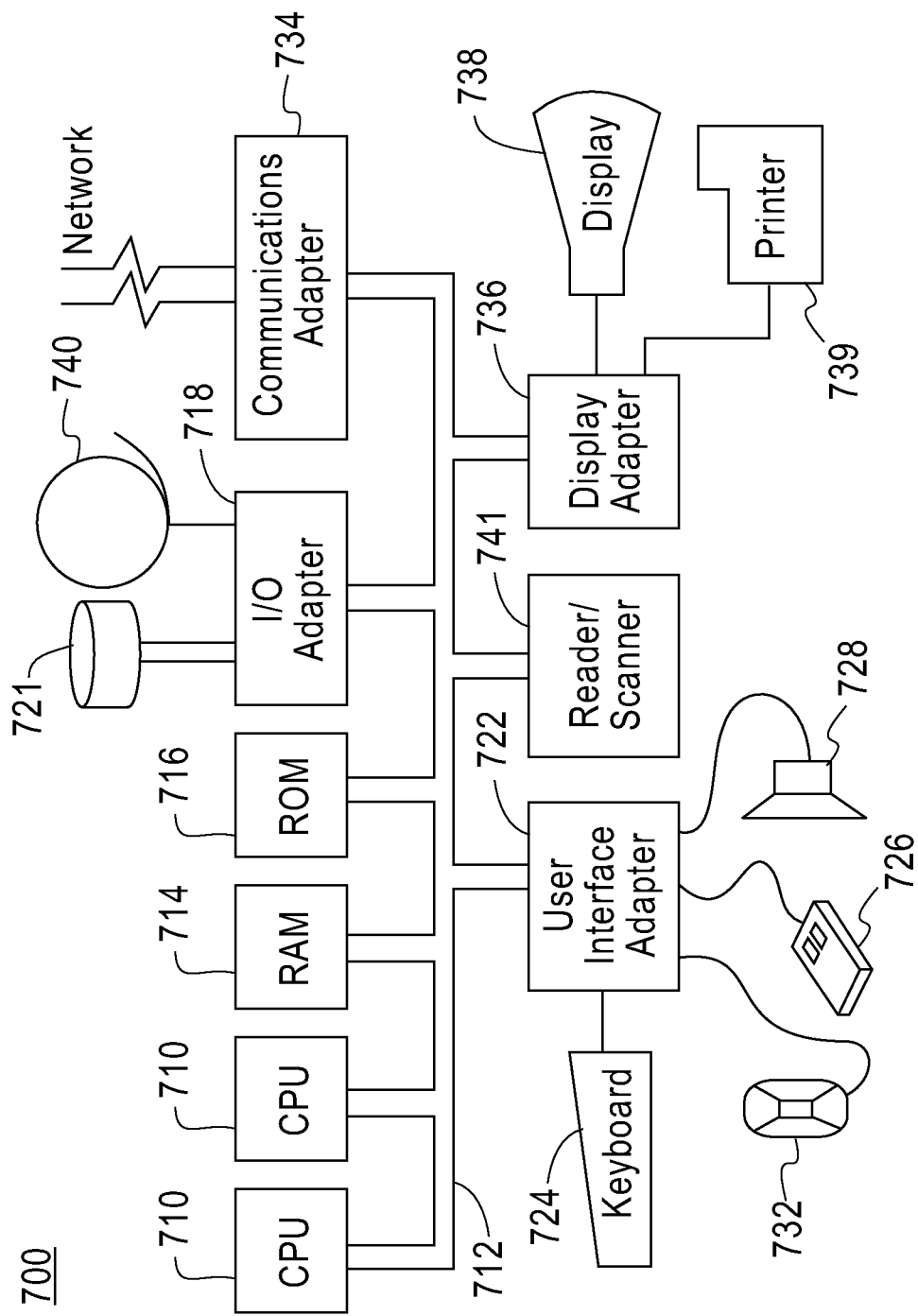
FIG. 7 illustrates an exemplary hardware/information handling system 700 for incorporating the present invention therein.

FIG. 7 illustrates a typical hardware configuration of an information handling/computer system in accordance with the invention and which preferably has at least one processor or central processing unit (CPU) 711.

The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer 739 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating both of CPU's identified as element 710 in FIG. 7 and hardware above, to perform the method of the invention. In addition, CPU 710 may exemplarily provide means for processing input means receiving and processing input data and a set of models, each model in the set of models representing a different event. CPU 710 may exemplarily universal pattern decoder means including transforming means, the decoder transforming models using the input data and associating output patterns with original models that are changed least during the transforming, the universal pattern decoder means being configured to select criteria for training the set of models and selecting control parameters, which control how fast and to what degree a model is transformed while the model is exposed to the input data as well as output means outputting best associated patterns chosen by the universal pattern decoder. Additionally, CPU 710 may provide a processor including a change determination unit configured to apply the input data to the set of models to transform the set of models, and configured to determine which of said models is changed least during the transforming.

Figure 8:
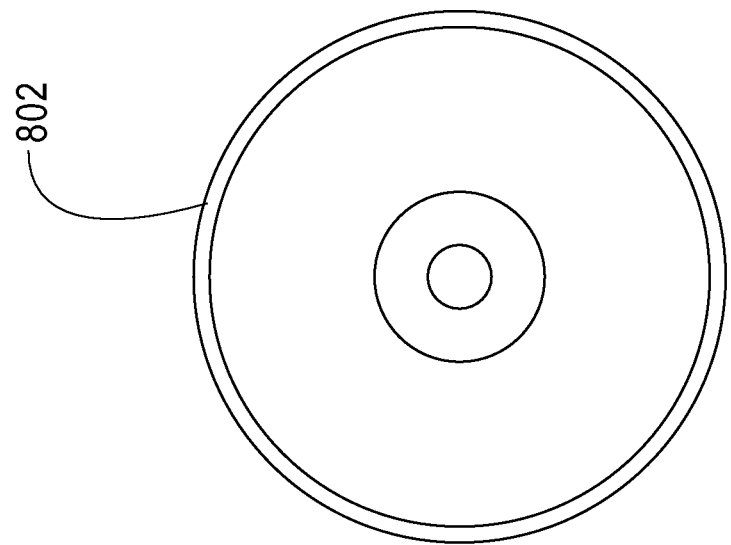
FIG. 8 illustrates a signal bearing medium 800 (e.g., storage medium) for storing steps of a program of a method according to the present invention.
Figure 8:
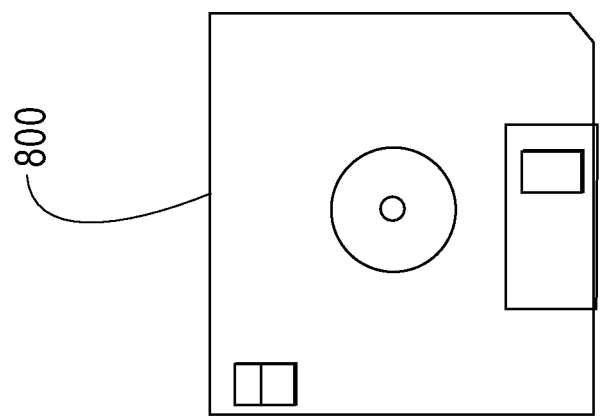

This signal-bearing media may include, for example, a RAM contained within the CPU 711, as represented by the fast-access storage for example. Alternatively, the instructions may be contained in another signal-bearing media, such as a magnetic data storage diskette 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

Having thus described our invention, what we claim as new and desire to secure by Letters Patent is as follows:

1. A universal pattern processing system receiving input data and producing output patterns that are best associated with said input data, comprising:
    an input unit configured to input and process said input data and a set of models, each model in said set of models representing a different event;
    a universal pattern decoder unit comprising a transforming unit, said universal pattern decoder unit being configured to transform, in a processor in a computer, models using the input data and to associate output patterns with original models that are changed a least amount during the transforming, said universal pattern decoder unit being configured to select criteria for training said set of models and selecting control parameters, which control how fast and to what degree a model is transformed while the model is exposed to the input data; and
    an output unit configured to output best associated patterns chosen by the universal pattern decoder unit,
    wherein said universal pattern decoder unit associates one of text data, an audio signal, a video signal, and a biometric signal of said input data with one of decoded words for speech recognition, a translation, and a biometric for a speaker identification of said output patterns.

2. The system as claimed in claim 1, where the universal pattern decoder unit comprises at least one of a speech recognizer, an image recognizer, a segmentation system, a machine translation, a search engine, a text-to-speech, a pattern recognizer, and a language processor.

3. The system as claimed in claim 1, wherein the transformation unit comprises at least one of Maximum Likelihood training, Maximum Entropy training, EM training, Maximum Mutual Information training, Baum-Welch training, Extended Baum-Welch training, Bayesian network training, supervised training, unsupervised training, and Hidden Markov Model training.

4. The system as in claim 1, wherein a measuring of a change during a transformation comprises at least one of the following metrics:
    one or more differences scores of transformed and original models;
    one or more of slopes through a score curve of model transformations;

one or more tangents to a score curve of model transformations; and one or more tangent hyperplanes to a score manifold of model transformations.

5. A method of universal pattern processing in a universal pattern processor that receives input data and produces output patterns that are best associated with said input data, said method comprising:

receiving and processing input data and a set of models, each model in said set of models representing a different event;

transforming, using a computer processor, universal pattern processing models using the input data, criteria selected for training said set of models and selected control parameters, which control how fast and to what degree a model is transformed while the model is exposed to the input data;

associating output patterns with original models that changed least during the transformation process; and outputting best associated patterns, wherein said associating comprises associating one of text data, an audio signal, a video signal, and a biometric signal of said input data with one of decoded words for speech recognition, a translation, and a biometric for a speaker identification of said output patterns.

6. The method as claimed in claim 5, wherein the input data processing comprises at least one of the following:

signal processing, textual processing, audio processing, image processing, video processing, binary data processing, analog data processing, biometrics sensor processing, and language processing.

7. The method as claimed in claim 5, wherein the universal pattern decoder process comprises at least one of the following:

a speech recognition process, an image recognition process, segmentation process, a machine translation, a search, a text-to-speech process, a pattern recognition process, and a summarization or simplification.

8. The method as claimed in claim 5, wherein the transformation process comprises at least one of the following: Maximum Likelihood training, Maximum Entropy training, EM training, Maximum Mutual Information training, Baum-Welch training, Extended Baum-Welch training, Bayesian network training, supervised training, and unsupervised training.

9. The method as claimed in claim 5, wherein measuring a change of model process during a transformation comprises at least one of the following:

subtracting scores of transformed models from scores of original models;

computing slopes through a score curve of model transformations;

computing tangents to a score curve of model transformations;

computing tangent hyperplanes to a score manifold of model transformations;

computing support machine separation metric for one or more objects in any one of said differences scores of transformed models and original models, slopes through said score curve of model transformations, tangents to said score curve of model transformations, and tangent hyperplanes to said score manifold of model transformations; and computing a Hidden Markov Models metric that is accumulated from local Hidden Markov Model metrics for Hidden Markov Model states.

10. A non-transitory computer-readable storage medium on which are encoded machine-readable instructions which, when executed, cause a computer to perform the method of claim 5.

11. A digital computer comprising the non-transitory computer-readable storage medium of claim 10.

12. A system, comprising:

an input unit configured to receive input data and a set of models;

a processor comprising a change determination unit configured to apply the input data to the set of models to transform the set of models, and configured to determine which of said models is changed least during the transforming, wherein said to apply and to determine comprises associating one of text data, an audio signal, a video signal, and a biometric signal of said input data with one of decoded words for speech recognition, a translation, and a biometric for a speaker identification of said out-put patterns.

13. The system according to claim 12, wherein said change determination unit is configured to determine a degree to which each of the set of models is changed.

14. The system according to claim 13, wherein said determination unit determines the degree to which each of the set of models is changed by comparing an original model to a transformed model using a plurality of metrics.

15. The system according to claim 12, wherein the set of models are transformed using controlling parameters, which control how fast and to what degree a model is transformed while the model is exposed to the input data.

16. The system as claimed in claim 4, wherein said measuring of said change further comprises a vector support machine separation metric for one or more objects in any one of said differences scores of transformed models and original models, slopes through said score curve of model transformations, tangents to said score curve of model transformations, and tangent hyperplanes to said score manifold of model transformations.

17. The system as claimed in claim 4, wherein said measuring of said change further comprises a Hidden Markov Models metric that is accumulated from local Hidden Markov Model metrics for Hidden-Markov-Model states.

* * * * *